US011995464B2

(12) United States Patent
Chivukula et al.

(10) Patent No.: US 11,995,464 B2
(45) Date of Patent: *May 28, 2024

(54) CONFIGURING DEVOPS PIPELINES USING DRAG AND DROP TECHNIQUES

(71) Applicant: Opsera Inc, San Jose, CA (US)

(72) Inventors: Ravi Kumar Chivukula, San Jose, CA (US); Chandra Ranganathan, San Jose, CA (US); Todd Barczak, Orlando, FL (US); Sundar Rajan Renganathan, Chennai (IN); Vasanthavishnu Vasudevan, Phoenix, AZ (US); Purushothaman Srinivasan, Chennai (IN)

(73) Assignee: Opsera Inc., San Jose, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 17/212,852

(22) Filed: Mar. 25, 2021

(65) Prior Publication Data
US 2022/0121478 A1  Apr. 21, 2022

Related U.S. Application Data

(63) Continuation of application No. 17/122,878, filed on Dec. 15, 2020.
(Continued)

(51) Int. Cl.
*G06F 9/48* (2006.01)
*G06F 8/34* (2018.01)
(Continued)

(52) U.S. Cl.
CPC ............. *G06F 9/4843* (2013.01); *G06F 8/34* (2013.01); *G06F 9/223* (2013.01); *G06F 9/48* (2013.01);
(Continued)

(58) Field of Classification Search
CPC ........ G06F 9/48; G06F 9/4806; G06F 9/4843; G06F 9/4881; G06F 9/50; G06F 9/5005;
(Continued)

(56) References Cited

U.S. PATENT DOCUMENTS

2010/0257015 A1* 10/2010 Molander ............... G06Q 10/06
707/E17.014
2012/0159494 A1* 6/2012 Shafiee ................. G06F 9/5038
718/102

(Continued)

OTHER PUBLICATIONS

Zhang et al: "CloudWF: A Computational Workflow System for Clouds Based on Hadoop", CloudCom 2009, LNCS 5931, pp. 393-404, 2009, Springer-Verlag Berlin Heidelberg (Year: 2009).*

(Continued)

*Primary Examiner* — Charles M Swift
(74) *Attorney, Agent, or Firm* — David R. Stevens; Stevens Law Group

(57) ABSTRACT

The present invention extends configuring development and operations pipelines using drag and drop techniques. Through user interface gestures, users can form and manage pipelines that span any combination of: public cloud resources, private cloud resources, user on-premise resources, etc., in accordance with appropriate (cloud and/or on-premise) profile information. The user interface facilitates pipeline (re)configuration as appropriate to address alterations to workflows, upgrades to DevOps tools, removal of functionality from a workflow, etc. The user interface enables customers to build no-code pipelines for various use cases in a drag and drop manner. Users can integrate collaboration tools, notifications, and approval gates offering thresholds at each and every step. In addition, the pipeline framework captures logs and provides a summary via livestream and also upon completion of each pipeline activity and after each pipeline.

20 Claims, 9 Drawing Sheets

Related U.S. Application Data

(60) Provisional application No. 63/094,819, filed on Oct. 21, 2020.

(51) Int. Cl.
*G06F 9/22* (2006.01)
*G06F 9/50* (2006.01)

(52) U.S. Cl.
CPC .......... *G06F 9/4806* (2013.01); *G06F 9/4881* (2013.01); *G06F 9/50* (2013.01); *G06F 9/5005* (2013.01); *G06F 9/5027* (2013.01); *G06F 9/5038* (2013.01); *G06F 9/5061* (2013.01); *G06F 9/5072* (2013.01); *G06F 9/5077* (2013.01)

(58) Field of Classification Search
CPC .... G06F 9/5027; G06F 9/5038; G06F 9/5061; G06F 9/5072; G06F 9/5077
See application file for complete search history.

(56) References Cited

U.S. PATENT DOCUMENTS

| 2014/0280961 | A1* | 9/2014 | Martinez | H04L 41/40 709/226 |
| 2019/0251488 | A1* | 8/2019 | Delfranco | G06F 16/951 |
| 2021/0065119 | A1* | 3/2021 | Magazine | G06Q 10/103 |
| 2021/0314379 | A1* | 10/2021 | Sodagar | H04L 65/762 |
| 2022/0050728 | A1* | 2/2022 | Foster, II | G06F 9/505 |

OTHER PUBLICATIONS

Mao et al., "GreenPipe: a Hadoop Based Workflow System on Energy-efficient Clouds", 2012 IEEE 26th International Parallel and Distributed Processing Symposium Workshops & PhD Forum, 2912, IEEE, pp. 2211-2219 (Year: 2012).*

* cited by examiner

CONFIGURING DEVOPS PIPELINES USING DRAG AND DROP TECHNIQUES

RELATED APPLICATIONS

This application is a continuation of U.S. application Ser. No. 17/122,878 entitled "DevOps Declarative Domain Based Pipelines" and filed Dec. 15, 2020, which in turn claims the benefit of U.S. Provisional Application Ser. No. 63/094,819 entitled "DevOps Declarative Pipelines" and filed Oct. 21, 2020, which is hereby incorporated herein by reference in its entirety

TECHNICAL FIELD

The present disclosure relates generally to DevOps. Aspects include building, configuring, orchestrating, and integrating DevOps declarative and policy-based pipelines.

BACKGROUND

DevOps represents a change in IT culture, focusing on rapid software and information technology service delivery through the adoption of agile, lean practices in the context of a system-oriented approach. DevOps emphasizes people (and culture), and it seeks to improve collaboration between operations and development teams. DevOps implementations utilize technology—especially automation tools that can leverage an increasingly programmable and dynamic infrastructure from a life cycle perspective. As such, DevOps can be utilized to shorten systems development lifecycle, improve the ability to provide continuous software delivery and help improve quality and security posture.

In general, a platform is an environment in which program code is executed. The environment can include hardware, operating system, associated programming interfaces, and other underlying software. With respect to DevOps, a DevOps platform provides an environment for creating and executing DevOps pipelines. A DevOps pipeline can include a set or combination of interconnected tools, also referred to as a "toolchain", that aids in the delivery, development, and management of digital resources (e.g., software, applications, etc.) throughout the development life cycle. DevOps tools can fit into one or more categories supporting DevOps initiatives, such as, for example, plan, create, verify, package, test, release, configure, monitor, validate, version control, and security.

Appropriately configured and executed DevOps platforms and pipelines add some level of automation to digital resource (e.g., software) development and deployment, increasing agility. However, configuring and executing DevOps platforms and pipelines often includes many manual processes and can require both significant time (e.g., weeks and potentially even months) and human resources to complete. For example, DevOps platform configuration can include manually provisioning and allocating various hardware, network, and storage resources from a cloud provider. DevOps pipeline creation and execution can include manually managing tool interactions with platform resources and between various tools. In some aspects, human resources are expended to generate "glue code" (e.g., custom code, custom scripts and manual integration) that connects and promotes appropriate interoperation between different tools in a pipeline/toolchain.

Further, many platform and pipeline environments/providers restrict platforms to prescribed resource configurations and/or functionality, limit flexibility by preventing customers from selecting their own choice of tools, and do not offer out of the box or native integration to the toolchain to customers.

BRIEF DESCRIPTION OF THE DRAWINGS

The specific features, aspects and advantages of the present invention will become better understood with regard to the following description and accompanying drawings where.

DETAILED DESCRIPTION

Figure 1:
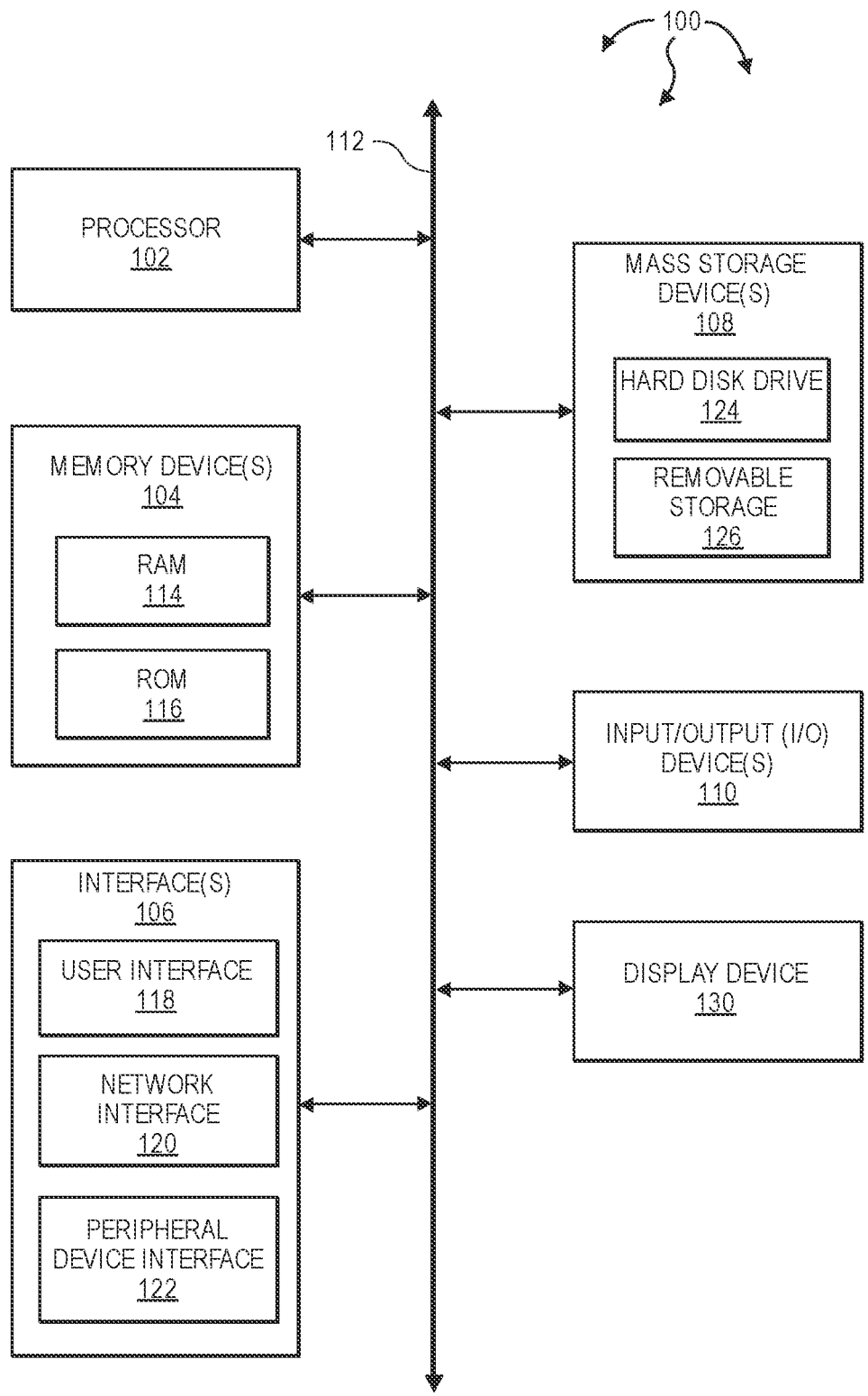
FIG. 1 illustrates an example block diagram of a computing device.

The present invention extends to methods, systems, and computer program products for building, configuring, orchestrating, and integrating DevOps declarative and policy-based pipelines.

Declarative pipelines can span across multiple cloud environments, tools, and stages. A user can build a pipeline (across any of a variety of domains) by leveraging policy-based pipelines and declarative pipelines in a matter of minutes and with "no code". Pipelines orchestrate and integrate with customer choice of tools and/or tools offered by a pipeline provider. Use of customer tools protects customer existing investment and leverages solutions to build quality gates, security gates, approvals and integrate with multiple deployment tools.

A unified console allows user to execute pipeline related tasks and activities. An activity log provides log data across various pipeline stages using a unique identifier (e.g., pipeline ID, run count, project, or custom tags that the user provides in the pipeline). Nested pipelines can be built and configured, where users pass the input and output between one or more pipelines, build the dependencies, and execute tasks based on conditions and inputs. Tasks can be executed in parallel in each pipeline. Nested pipelines and parallel execution give users greater control and flexibility to execute tasks efficiently.

Aspects of the invention include the capability to configure tool actions and functions for essentially any DevOps tool included in a pipeline without leaving the unified console. Tool actions and functions can be configured via a User Interface (UI), Application Program Interface (API), or Command Line Interface (CLI).

DevOps continuous orchestration as a platform can be used to assist with DevOps tool collection management, integrate DevOps tools seamlessly with plug and play architecture, automate workflows with drag and drop options and/or plug and play options, aggregate and contextualize logs and provide continuous insights across DevOps environments. As such, DevOps continuous orchestration can provide business value, including faster software delivery, improved agility, doing more with less, improved visibility, and enhanced predictive capabilities.

A DevOps Continuous Orchestration platform can help users automate integration and management of pipelines/workflows, across the DevOps environment and accelerate the overall software deployment, agility, and significantly reduce (if not eliminate) custom code requirements associated with building pipelines.

In one aspect, continuous orchestration is utilized to provide toolchain automation, including, per DevOps tool, one-click DevOps tool deployment, DevOps tool lifecycle management, (replace, migrate, upgrade and delete), DevOps tool registry, and DevOps tool configuration management, and DevOps tool job management. Accordingly, a DevOps tool chain platform and DevOps continuous orchestration can help improve security and compliance posture.

DevOps tool chain automation can also be integrated with declarative pipelines and unified insights and logs to provide more comprehensive solutions. DevOps continuous orchestration can provide a variety of benefits with respect to declarative pipelines. DevOps continuous orchestration can provide draft and drop options. Users can build the pipelines/workflows across various DevOps stages (code commit, software builds, security scans, vault integration, approvals, notifications, thresholds and gates, quality testing integrations, validation, integrating with change control and monitoring tools, deployment and providing a view of activity logs across every stage, etc). Users can also (e.g., leveraging continuous integration) build pipelines across Software Engineering, Software Development Life Cycle (SDLC), Kubernetes, Infrastructure as a Code (IaC), multi-language pipelines, Salesforce (SFDC) (e.g., Continuous Integration (CI) and/or Continuous Development (CD)) platforms, Artificial intelligence platforms, and Machine learning platforms, ServiceNow, SaaS applications, pega, database deployments, and workday platforms.

DevOps Continuous orchestration can also provide a variety of benefits with respect to unified insights and logs. A data transformer operates as a data normalization and serialization engine, converting raw data across a DevOps environment and tools. The data transformer can store normalized/serialized data in a data lake in accordance with a platform provider customized schema. DevOps continuous orchestration can then sequence, aggregate, and contextualize logs and provide an intuitive way of troubleshooting issues across a DevOps environment. As such, users can use unified insights and logs to capture historical data for compliance and audit purposes and provide a build manifest for root cause analysis. DevOps continuous orchestration can also process logs and leverage a Key Performance Indicator (KPI) framework. DevOps continuous integration can provide an intelligent dashboard across any of a number of (e.g., 85+) KPI's and any of a number of different (e.g., six or more) dimensions (including (Planning, Development/pipelines, security, quality, operations, and source code) to the customers. The intelligent dashboard can help users make more informed decisions and do more with less.

Turning to FIG. 1, FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices or cloud and DevOps tools, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory. Processor(s) 102 can be real or virtual and can be allocated from on-premise, cloud computing or any cloud provider.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory. Memory device(s) 104 can be real or virtual and can be allocated from on-premise, cloud computing or any cloud provider.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media. Mass storage device(s) 108 can be real or virtual and can be allocated from on-premise, cloud computing or any cloud provider.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like. I/O device(s) 110 can be real or virtual and can be allocated from on-premise, cloud computing or any cloud provider.

Display device 130 includes any type of device capable of displaying information to one or more users of computing device 100. Examples of display device 130 include a monitor, display terminal, video projection device, and the like. Display device 130 can be real or virtual and can be allocated from on-premise, cloud computing or any cloud provider.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122. Interface(s) 106 can be real or virtual and can be allocated from on-premise, cloud computing or any cloud provider.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth. Bus 112 can be real or virtual and can be allocated from on-premise, cloud computing or any cloud provider.

In this description and the following claims, DevOps is defined as software and information services delivery, including the adoption of agile, lean practices in the context of a system oriented approach. DevOps can improve collaboration between operations and development teams. DevOps implementations can utilize technology, such as, for example, automation tools, that leverage an increasing programmable and dynamic infrastructure from a life cycle perspective. As such, DevOps can facilitate shortened systems development lifecycle and provide continuous delivery of developed digital resources (e.g., high quality software). DevOps is defined to include: Security and Operations (SecOps), Architecture and Operations (ArchOps), Testing and Operations (TestOps), Data and Operations (DatapOps).

In this description and the following claims, a "DevOps toolchain" is defined as a set or combination of interconnected tools that aid in the delivery, development, and management of developed resources (e.g., software applications) throughout the development life cycle, as coordinated by an organization that uses DevOps practices. DevOps tools can be directed to one or more DevOps initiatives, such as, for example, plan, create, verify, package, release, configure, monitor, version control, etc.

In this description and the following claims, a "microservice architecture" (MSA) or "microservices" is a technique of developing software systems with a focus on building single-function modules with (e.g., well) defined interfaces and operations. Within a microservices architecture, multiple individual microservices can be loosely coupled to one another using lightweight protocols. Thus, an MSA can include a loosely coupled arrangement of de-centralized services. Services in an MSA can communicate over a network using technology agnostic protocols (e.g., HyperText Transfer Protocol (HTTP), HTTPS (secure HTTP), APIs (Application Program Interfaces using REST, JSON, YAML, etc.) API gateway, SSL, TLS, etc.), can be independently deployable, and can be implemented using different programming languages, databases, operating environments.

Aspects of the invention include configuring and changing DevOps tools and DevOps tool chains in an MSA. For example, a DevOps toolchain can be developed and deployed independently of or in combination with one or more DevOps tools in a toolchain or techstack in any cloud provider with user choice.

In this description and the following claims, a "virtual private cloud" (or VPC) is defined as an on-demand configurable pool of shared computing resources allocated within a (e.g., public) cloud environment, providing a certain level of isolation between the different organizations using the resources. Isolation between one VPC user and other users of the same cloud can be achieved through allocation of a private IP subnet and a virtual communication construct per user. In a VPC, a Virtual Private Network (VPN) function can provide an organization remote access to its VPC resources.

In this description and the following claims, a "configuration management database" (or CMBD) is defined as a database used (e.g., by an organization) to store information about hardware and software assets (which may be referred to as Configuration Items (CI)). CMBDs can be used to break down configuration items into logical layers. CMBDs can act as a data warehouse for an organization and also store information regarding the relationships among assets. As such, a CMDB provides a mechanism of understanding an organization's assets and their relationships to one another, such as, information systems, upstream sources or dependencies of assets, and the downstream targets of assets. In one aspect, DevOps tools, DevOps tool configuration, pipelines, templates, workflows, cloud configurations, etc. can be stored in a CMDB.

Aspects of the invention include building, configuring, orchestrating and integrating DevOps declarative and policy-based pipelines. Pipelines can be constructed using significantly reduced amounts of code. In some aspects, zero coding or almost no code is used to construct a pipeline (and may be referred to as "no code"). Pipelines can also be vendor and/or tool agnostic. As such, pipelines are not tied to any particular tool or cloud vendor and can span across multiple clouds, tools, and stages. A DevOps pipeline can include a set or combination of interconnected tools, also referred to as a "toolchain", that aids in the delivery, development, and management of digital resources (e.g., software, code configuration, data, and metadata) throughout the development life cycle. Pipelines can span various domains including software development, software engineering, Kubernetes, Infrastructure as a Code (IaC), multi-language, Artificial Intelligence (AI)/Machine Learning (ML), Salesforce (SFDC) (CI and/or CD), service now, SaaS applications, pega, Database (DB), workaday, package deployments, etc. As such, pipelines can include software development pipelines, software engineering pipelines, Kubernetes pipelines, IaC pipelines, Multilanguage pipelines, Artificial Intelligence (AI)/Machine Learning (ML) pipelines, Salesforce (SFDC) pipelines, service now (e.g., developer) pipelines, SaaS application pipelines, pega pipelines, database (DB) deployment pipelines, any type of package deployment pipelines, workaday pipelines, etc. Accordingly, pipelines can be created with a reduced learning curves and providing the same level of visibility and insights irrespective of pipeline/domain type. For example, a platform provider can include intelligence to provide best practices across a plurality of (and potentially all) domains.

For software engineering pipelines, DevOps tools can fit into one or more categories supporting DevOps initiatives, such as, for example, plan, create, verify, package, test, release, configure, monitor, validate, version control, and security. For AI/ML pipelines, DevOps tools can fit into one or more categories supporting additional DevOps initiatives including fetching data and/or code from various sources (e.g., source code, databases, unstructured data, NO SQL DB, data warehousing databases, etc.), preparing the data, training models, packaging models, validating models, deploying models, and monitoring models. For SFDC pipelines and other SaaS software applications next to SFDC pipelines, DevOps tools can fit into one or more categories supporting additional DevOps initiatives including fetching objects, classes, metadata, profiles from an organization, comparing with a source code repository, providing validation for a release manager to approve, building a package, validating security, testing, approvals, backing up and recovering data, and deploying package to (e.g., higher level) organizations.

Pipeline Architecture

Figure 2:
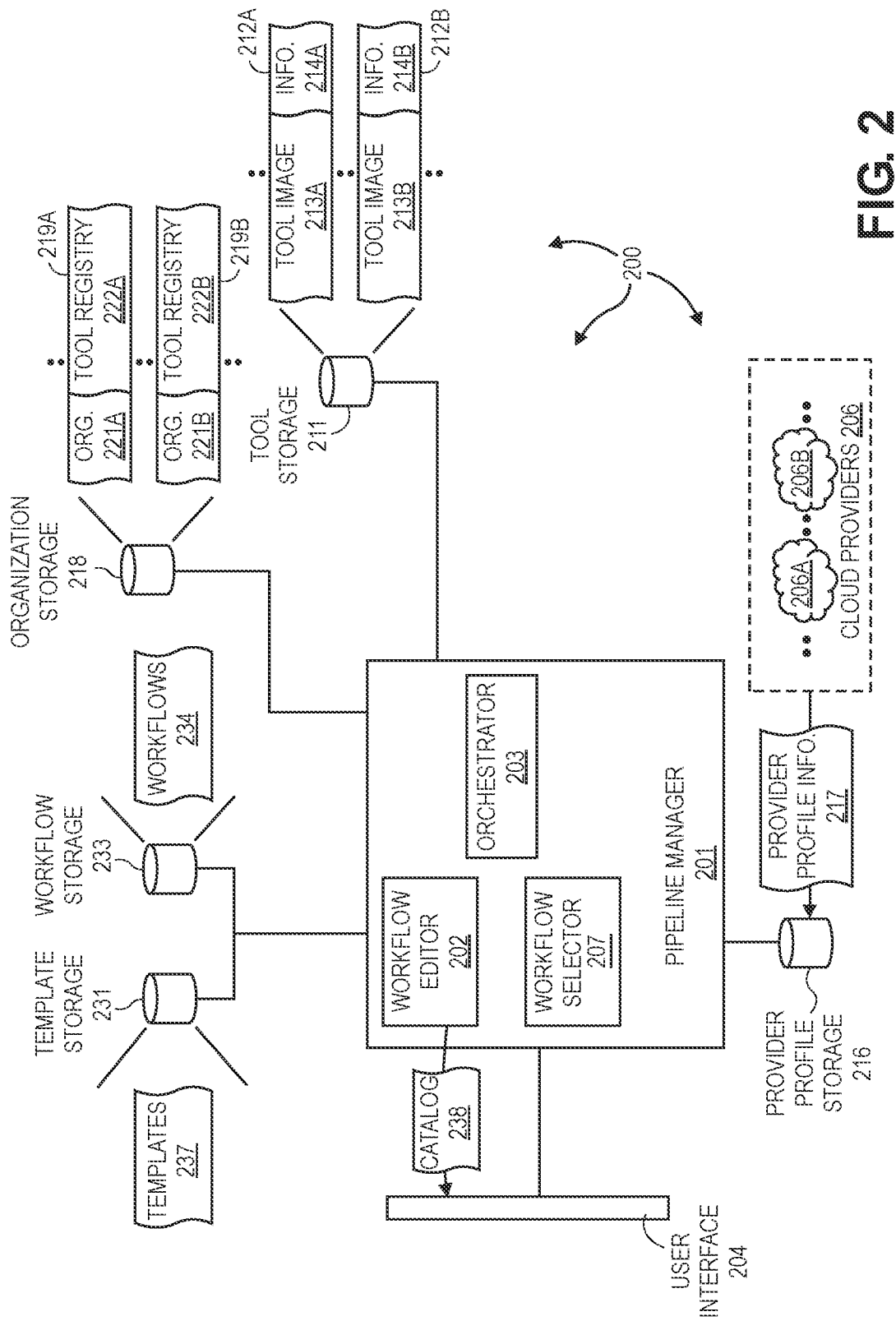
FIG. 2 illustrate an example computer architecture that facilitates configuring development and operations pipelines

FIG. 2 illustrates an example computer architecture 200 that facilitates configuring development and operations pipelines. As depicted, computer architecture 200 includes pipeline manager 201, user interface 204, cloud providers 206, tool storage 211, provider storage 216, organization storage 218, template storage 231, and workflow storage 233. Pipeline manager further includes workflow editor 202, orchestrator 203, and workflow selector 207. Cloud providers 206 include a plurality of cloud providers including cloud providers 206A, 206B, etc.

Provider profile storage 216 is configured to store cloud provider profile information. For example, provider profile storage 216 can store profile information 217 for cloud providers 206, including cloud providers 206A, 206B, etc. Orchestrator 203 can form and manage clouds and clusters that include cloud resources in accordance with provider profile information stored in provider profile storage 216. Users may also send on-premise profile information for user on-premise resources to pipeline manager 201. Pipeline manager 201 can form and manage clouds and clusters including user on-premise resources in accordance with on-premise profile information.

As such, pipeline manager 201 can form and manage pipelines that span any combination of: public cloud resources (e.g., spanning one or more public clouds), private cloud resources (e.g., spanning one or more private clouds), user on-premise resources, etc., in accordance with appropriate (cloud and/or on-premise) profile information. For example, a cloud and cluster can be formed from: resources of cloud provider 206A, resources of cloud provider 206B, and user on-premise resources. Pipeline manager 201 can (re-)configure a pipeline as appropriate to address: alterations to workflows, upgrades to DevOps tools, removal of functionality from a workflow, etc.

Tool storage 211 is configured to store tool images and corresponding tool profile information for DevOps tools. For example, tool storage 211 can store DevOps tool 212A including tool image 213A and tool profile information 214A, DevOps tool 212B including tool image 213B and tool profile information 214B, etc. In one aspect, a pipeline provider (e.g., a corporation) controls pipeline manager 201. The pipeline provider can make various DevOps tools available to any users of pipeline manager 201. The pipeline provider can store the available DevOps tools at tool storage 211. Pipeline manager 201 can provide a catalog of available tools to registered users through user interface 204.

In another aspect, registered users may provide their own DevOps tools for deployment into a pipeline. User provided DevOps tools can also be stored at tool storage 211. Users may or may not share their tools with other users.

Per organization, organization storage 218 can store an indication of registered tools (e.g., from among tools stored in tool storage 211 and/or user provided tools). For example, entry 291A includes tool registry 222A (i.e., registered tools) for organization 221A. Similarly, entry 291B includes tool registry 222B (i.e., registered tools) for organization 221B. An organization's tool registry can be updated as tools included in a pipeline change (e.g., are added or removed).

In general, user interface 204 (e.g., a graphical user interface (GUI)) provides a unified self-service portal, including handling input/output (I/O), between user devices and pipeline manager 201. User interface 204 can interoperate with workflow editor 202 to facilitate functionality including: (a) selecting, modifying, and storing templates, (b) selecting, modifying, storing, and (e.g., "one click") deploying workflows, (c) logging into pipeline manager 201, (d) selecting, modifying, and storing organizational information, (e) presenting pipeline related operational information (e.g., logs, performance metrics, etc.) from pipeline manager 201, (f) presenting user notifications, (g) receiving user approvals and disapprovals, etc. In one aspect, user interface 204 includes drag and drop and/or plug and play functionality for selecting, modifying, and storing templates and workflows. For example, a user can utilize drag and drop and/or plug and play functionality to add DevOps tools to and/or remove DevOps tools from templates and workflows.

Template storage 231 stores templates 237. Templates 237 can include one or more pipeline templates for customers to create, clone, modify, and delete operations. Templates 237 can include preconfigured templates providing a reference point for users to build their own templates or use the preconfigured templates as is. A template can define policy conditions associated with different pipeline stages. In one aspect, templates 237 are stored in JSON.

Templates can include various amounts of detail based on the user's requirements. A template can follow a data model including various properties, such as, for example, Project, Roles, Type, Tags, Workflow, Plan, etc., and can include additional metadata, such as, for example, Name, ID, Owner, dates, etc. A template can be configured by anyone with privileges, and can be shared in a catalog (e.g., catalog 238).

A project can include a name and a relational (e.g., database) ID to the project the pipeline is orchestrating.

Roles include a user ID and role definition defining who has access to perform what tasks on this specific pipeline.

Tags can be used for classification, filtering, search, etc. Tags can also be used as a data source to define logic driven questions to assist users in selecting appropriate workflows. Tags can be string based text used to tag the pipeline for future filtering or search activity. Tags can also be used to drive machine learning and other data mining activities in order to facilitate providing analytics or suggest improvements or warn about issues in a pipeline.

A type can be string based text used to classify a type of workflow template the data represents. A type can also be used for searching, filtering and to drive logic based decisions (including ML learning) around user needs and patterns.

A plan can be an array of objects representing pipeline activities. Each pipeline activity can be stand alone and can include (but are not limited to): tool configuration, trigger logic, API connection details, notification rules/details, name, an active flag, and its overall location in the array. An array order (e.g., index) defines the order of operations for the plan. Each pipeline activity's tool configuration is editable at user interface 204 with custom rules and editing based on the individual supported tool. Accordingly, beyond some tool's ability to share data between pipeline activities, overall tool configuration can be a complete data model for what a $3^{rd}$ API or a microservice utilizes to complete its task.

Workflow editor 202 can package identifying information for templates 237 in catalog 238. User interface 204 can present catalog 238 to a user. As described, templates in templates 237 can include various amounts of detail based on user requirements, including Project, Roles, Type, Tags, Workflow, Plan, etc., and additional metadata, such as, for example, Name, ID, Owner, dates, etc. As such, catalog 238 can expose templates 237 based on user roles/needs and allows a user to "one click deploy" a workflow into a full Pipeline Orchestration Model.

Workflow storage 233 stores workflows 234. Workflows 234 can include workflows that are deployable to implement user requirements. Workflows can be built from scratch or built using a template as a starting point. A workflow can define policy conditions associated with different pipeline stages.

A workflow can be an object that includes a source (either a code repository or another data source that drives the entire workflow. The source can be a system or 3rd party technology, for example, immediate historical data on the state of the workflow. The source can be the current state of the workflow broken out into the last successful activity, running activity, or last failed activity. There are also properties around the overall state of the pipeline. A plan can be viewed as the (e.g., core) activities of a pipeline workflow.

In one aspect, a user can select a workflow template from catalog 238. User interface 204 can interoperate with workflow editor 202 to facilitate user one click deployment of a workflow template to a "My Pipelines" storage location. Through user interface 204/workflow editor 202, the user can edit properties in the pipeline. On a detail view, the user can edit the pipeline name (e.g., to facilitate more efficient searching), grant access to or revoke access from other users, add a project association, view activity logs, etc.

As part of the pipeline automation, users can view step by step activity logs for the orchestration of API calls (e.g., through user interface 204). Log activity includes (but is not limited to): starting of a pipeline by orchestrator 203, individual status updates on the calling of a "run job" operation to a configured tool, routine status update calls (e.g., as orchestrator 203 checks on the status of the job at given polling intervals), updates when requested tasks complete, etc.

In one aspect, orchestrator 203 captures data response from $3^{rd}$ party or provider microservice (e.g., in a RESTful manner) and stores the capture data response in an activity log. As such, a user can view workflow activities, workflow status (success, failed, running, unknown, etc.) as well as detailed communication in a viewer. The viewer can be provided at user interface 204 and can present data in JSON format. As such, raw activity data can be exposed, helping users troubleshoot problems.

In addition to viewing activity log data, user interface 204 facilitates pipeline data model and workflow template views, for example, in JSON format. Thus, data is more visible to the user.

User interface 204 and workflow editor 202 can interoperate to provide drag and drop, user interface visualization of, pipeline workflow configured based on a deployed pipeline workflow (e.g., template). Workflow editor 202 can facilitate activity by activity view of each activity (plan) in a workflow, showing users the name, ID, additional metadata, etc. Workflow editor 202 also allows a user to view individual activity logs (or all logs for that activity) as well as to perform actions such as start (when appropriate), stop, or configure.

User interface 204/workflow editor 202 can off unique configuration options based on the DevOps tool being used. A corresponding pipeline data model plan's tool configuration property can include tool specific properties for running the operation. The properties can include (but are not limited to) connection information (URLs, IP's, etc.), access tokens or account details (securely stored), activity details or other API metadata (e.g., entered into custom forms or provided as a JSON data package). Activities can be configured to hand off data from one to another. However, each activity in a workflow is also independent and can run on its own. An activity can have no dependencies unless a data property is expected from another activity.

User interface 204 can show/illustrate the activities of a workflow while they are running leveraging visual indications: text and color to indicate different status: running, successful, failed, etc. A pipeline can be run based on orchestration login in orchestrator 203. A workflow view can provide users with an overall start, stop and reset command to issue to orchestrator 203. A user can be prevented from running individual activities out or order and workflow policy is fully enforced. If an individual activity fails, the user resolves/reviews the issue through user interface 204/workflow editor 202, allowing them to restart the activity. Orchestrator 203 can review the status of the pipeline, re-start the last failed activity and if it completes successfully to continue onto the next activities in the pipeline. Orchestrator 203 can stop a workflow when the end of the pipeline is reached.

Pipeline Deployment and Orchestration

Figure 3A:
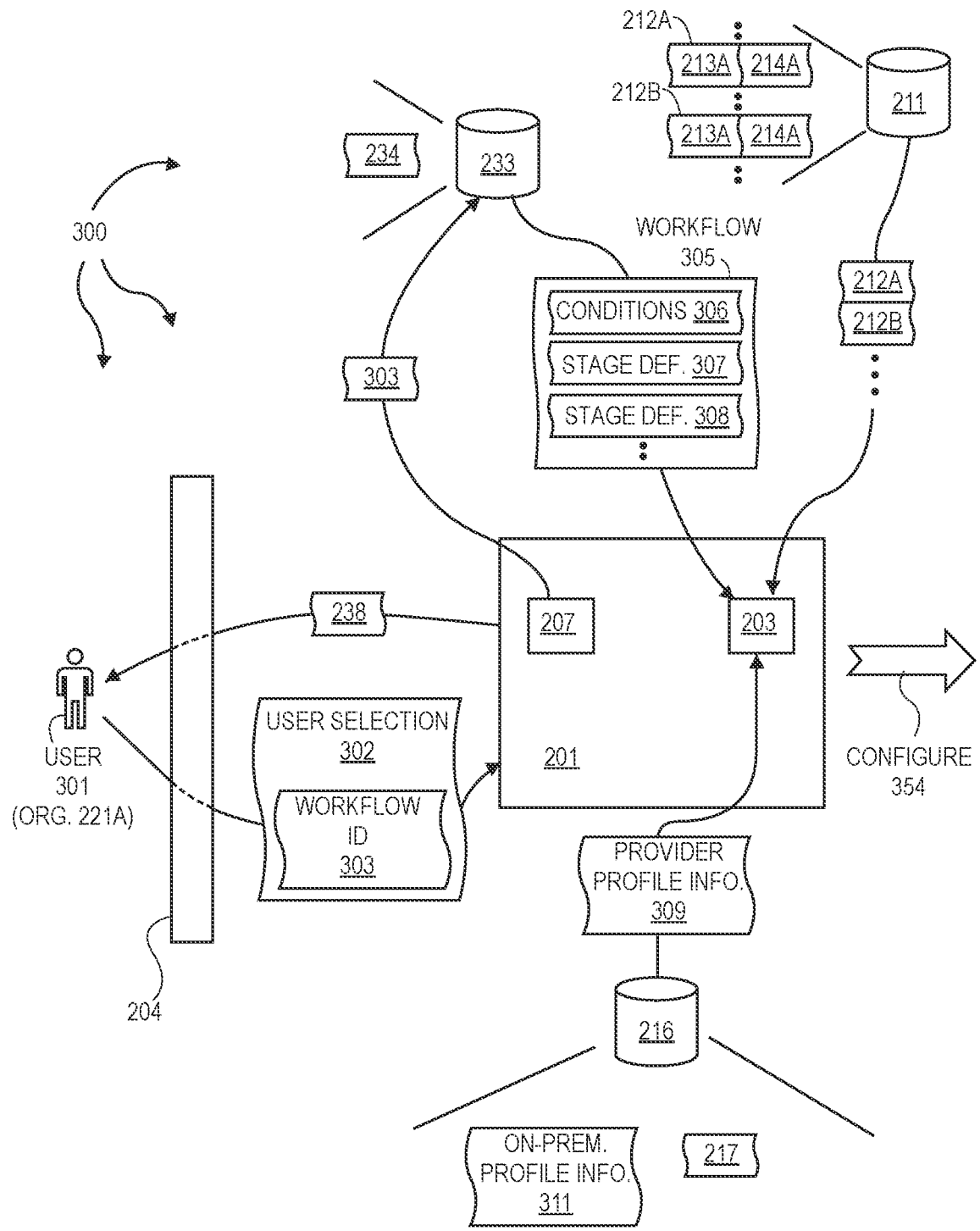
FIGS. 3A, 3B, and 3C illustrate an example computer architecture that facilitates deploying and orchestrating development and operations pipelines.
Figure 3B:
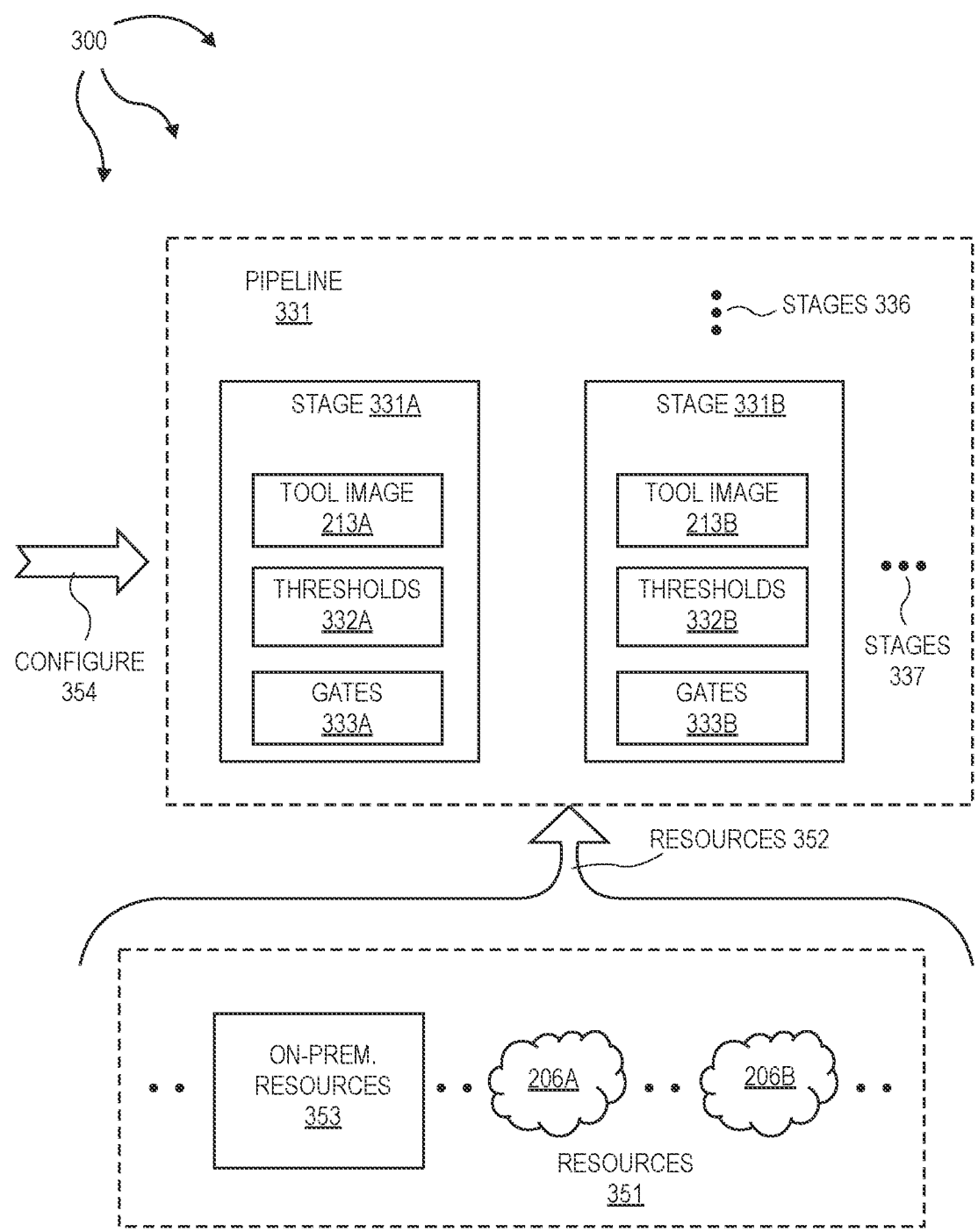
Figure 3C:
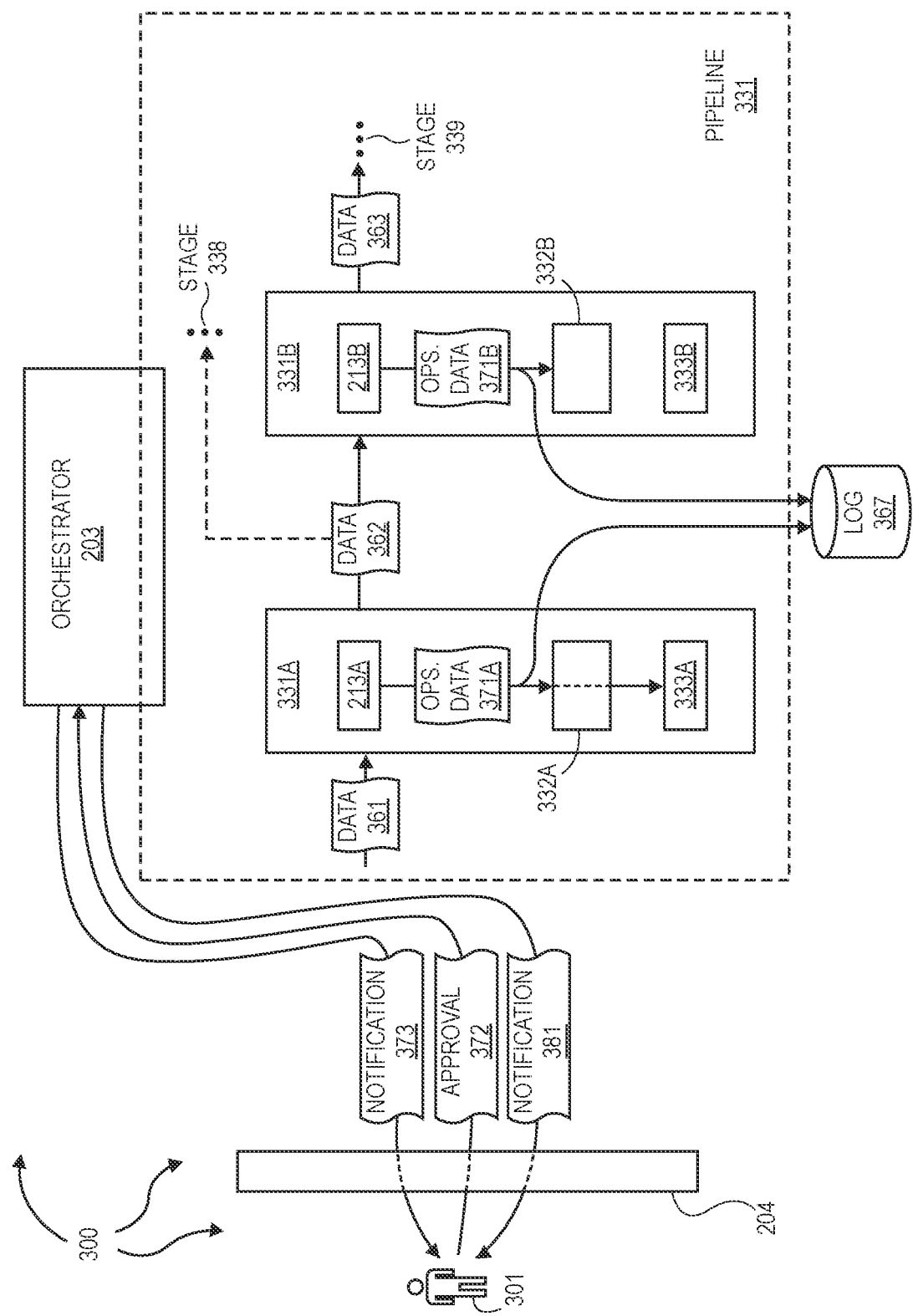

FIGS. 3A, 3B, and 3C illustrate an example computer architecture 300 that facilitates deploying and orchestrating development and operations (DevOps) pipelines. As depicted. User 301 can store on-premise profile information 311 in provider profile storage 216. On-premise profile information 311 can contain profile information corresponding to on-premise resources 353 (which may be on-premise resources of user 301/organization 221A).

Pipeline manager 201, through user interface 204, can present catalog 238 to user 301. User 301 can select a template from templates 237. User 301 can subsequently, and possibly after various editing operations, submit user selection 302, including workflow ID 303, to pipeline manager 201.

Figure 4:
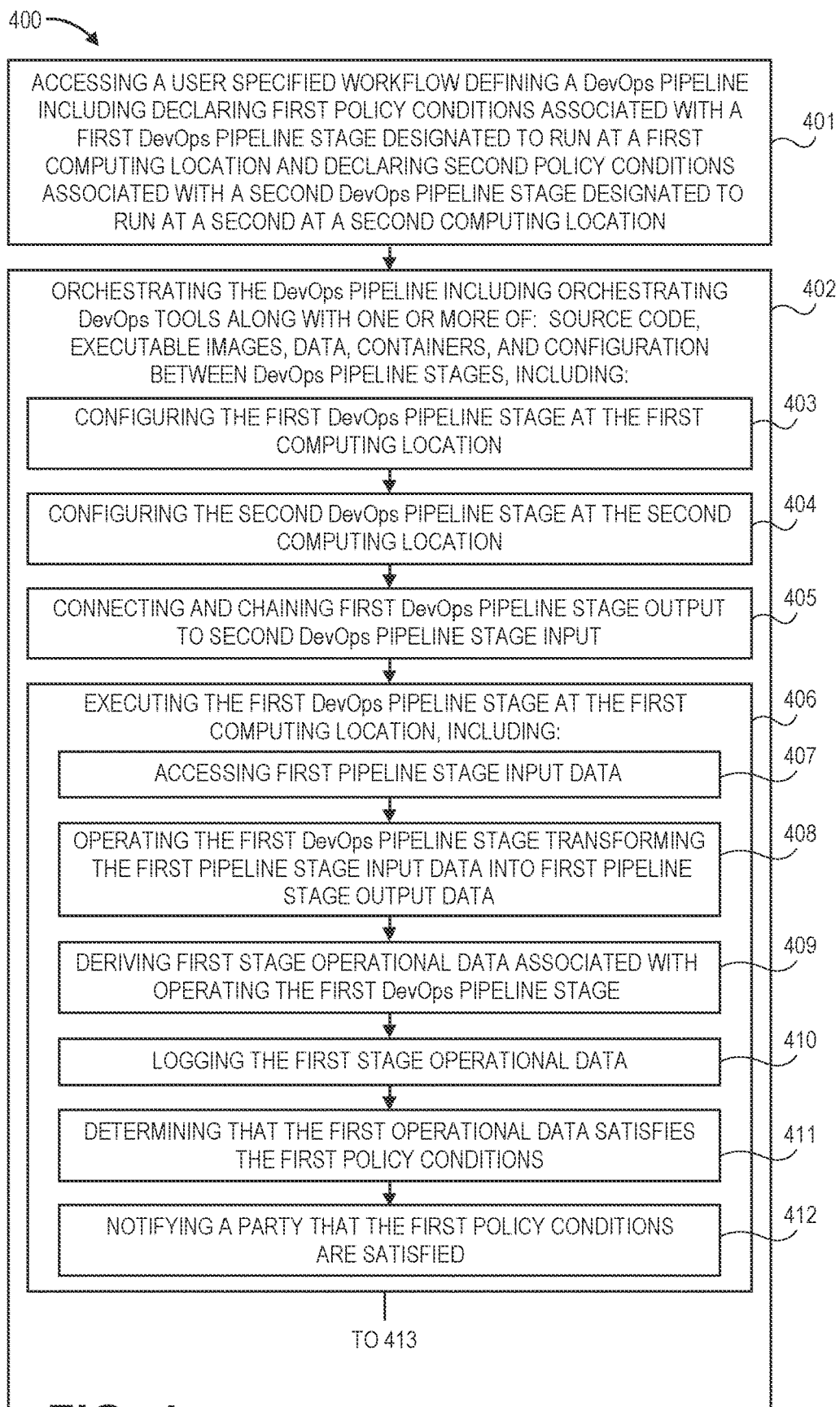
FIG. 4 illustrates a flow chart of an example method for deploying and orchestrating a development and operations pipeline.
Figure 4:
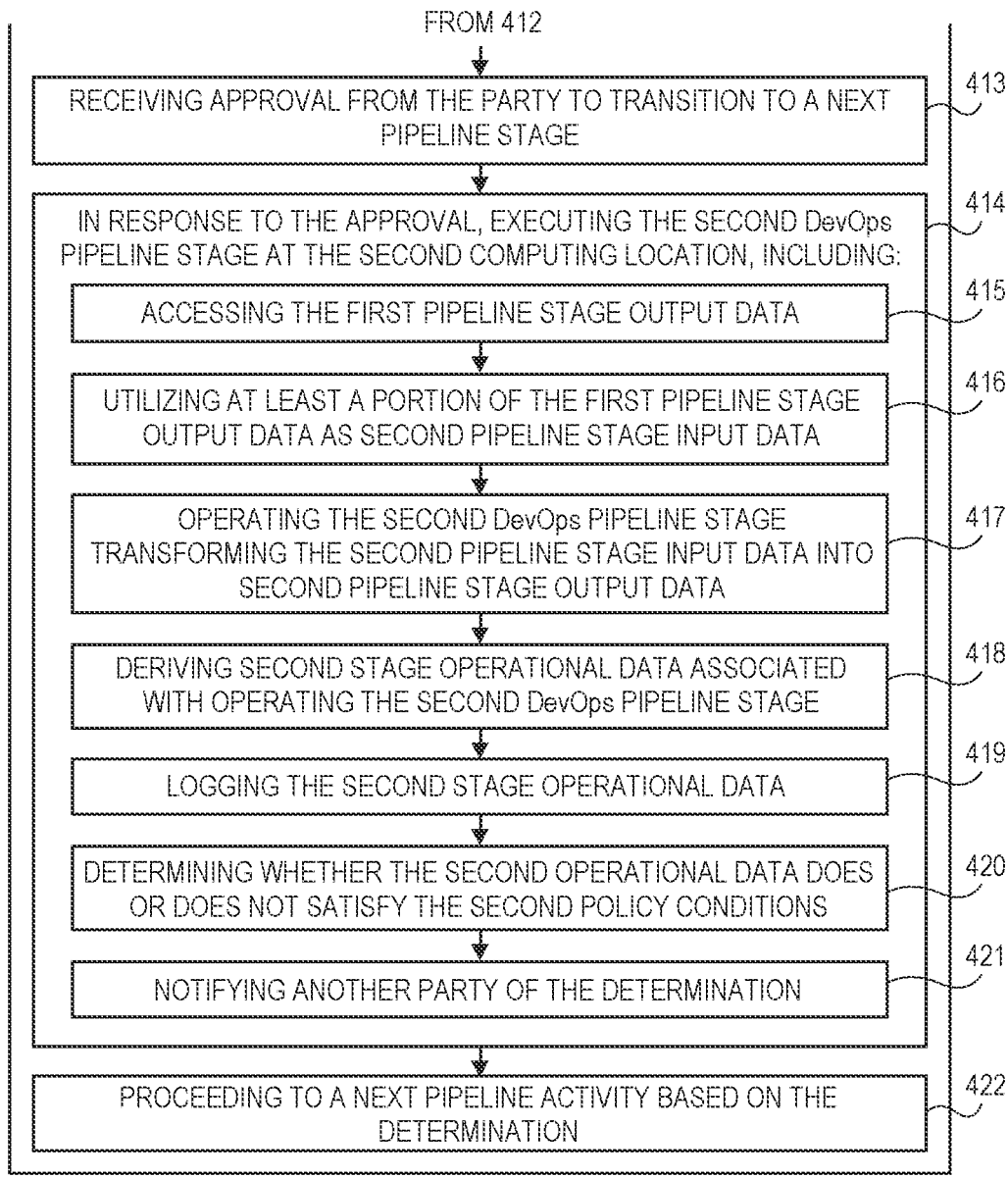

FIG. 4 illustrates a flow chart of an example method 400 for deploying and orchestrating a development and operations pipeline. Method 300 will be described with respect to the components and data in computer architecture 300.

Method 400 includes accessing a user specified workflow defining a DevOps pipeline including declaring first policy conditions associated with a first DevOps pipeline stage designated to run at a first computing location and declaring second policy conditions associated with a second DevOps pipeline stage designated to run at a second at a second computing location (401). For example, workflow selector 207 can use wokflow ID 303 to access workflow 305 from workflows 234. As depicted, workflow 305 includes conditions 306, stage definition 307, and stage definition 308 (and possibly defining one or more additional stages). Workflow 305 defines a DevOps pipeline. Conditions 306 define conditions associated with stages defined by 307, 308, etc. of the DevOps pipeline. In some aspects, Role Based Access Control (RBAC) is used to control access to and/or approval of thresholds and gates. Thus, threshold and/or gate related conditions included in conditions 306 can include access control conditions defined in accordance with RBAC.

Method 400 includes orchestrating the DevOps pipeline including orchestrating DevOps tool along with one or more of: source code, executable images, data, containers, and configuration between DevOps pipeline stages (402). For example (turning to FIG. 3B), orchestrator 203 can orchestrate pipeline 331, including tool images 213A, 213B, etc. as well as any of source code, executable code, data, containers, configuration, etc. between stages 331A, 331B, 336, 337, etc.

Orchestrator 203 can allocate resources 352 for pipeline 331 in accordance with provider profile information 309 and workflow 305. Resources 352 can include resources from one or more of: on-premise resources 353, cloud provider 206A, cloud provider 206B, as defined in provider profile information 309. As such, resources used to orchestrate pipeline 331 can span any combination of on-premise resources 353, cloud provider 206A, cloud provider 206B, etc. Further, different stages of pipeline 331 can run on different subsets of resources 352. For example, one stage can run on on-premise resources 353 while another stage runs on resources of cloud provider 206A or 206B.

Different stages can also run on resources spanning different providers. For example, a stage can run on resources spanning cloud providers 206A and 206B. A stage can also run on resources spanning on-premise resources 353 and one or more of cloud providers 206A and 206B. Orchestrator 203 can handle computing operations between different providers to facilitate pipeline 331.

Orchestrating the DevOps pipeline includes configuring the first DevOps pipeline stage at the first computing location (403). For example, orchestrator 203 can configure 354 stage 331A on a first subset of resources 352 in accordance with conditions 306, stage definition 307, provider profile information 309, and tool profile information 214A. Stage 331A includes tool image 213A, thresholds 332A, and gates 333A. Thresholds 332A and gates 333A can be defined in accordance with conditions 306. Configuring stage 331A in accordance with conditions 306 can include configuring stage 331A in accordance with RBAC defined access control conditions associated with thresholds 332A and gates 333A.

Orchestrating the DevOps pipeline includes configuring the second DevOps pipeline stage at the second computing location (404). For example, orchestrator 203 can configure 354 stage 331B on a second subset of resources 352 in accordance with conditions 306, stage definition 308, provider profile information 309, and tool profile information 214B. Stage 331B includes tool image 213B, thresholds 332B, and gates 333B. Thresholds 332B and gates 333B can be defined in accordance with conditions 306. Configuring stage 331B in accordance with conditions 306 can include configuring stage 331B in accordance with RBAC defined access control conditions associated with thresholds 332B and gates 333B.

One or more additional stages 336 can be configured in parallel to stage 331A and/or stage 331B. One or more additional stages 337 can also be configured in sequence with stage 331A and stage 331B.

Orchestrating the DevOps pipeline includes connecting and chaining first DevOps pipeline stage output to second DevOps pipeline stage input (405). For example, orchestrator 203 can connect stage 331A to stage 331B and chain the output of stage 331A to the input of stage 331B. Orchestrator 203 can also connect stage 331A to one or more of stages 336 and chain the output of stage 331A to the one or more of stages 336. Orchestrator 203 can also connect stage 331B to one or more of stages 336 and/or to one or more stages 337. Orchestrator 203 can chain the output of stage 331B to the one or more of stages 336 and/or to the one or more of stages 337. Orchestrator 203 can also connect one or more of stages 336 to one or more of stages 337. Orchestrator 203 can chain the output of the one or more of stages 336 to the one or more of stages 337 or vice versa. Accordingly, an arbitrarily configured pipeline 331 of interconnected stages can be formed spanning the resource of on-premise resources 353, cloud providers 206A, cloud provider 206B, etc.

Orchestrating the DevOps pipeline includes executing the first DevOps pipeline stage at the first computing location (406). For example (turning to FIG. 3C), orchestrator 203 can execute stage 331A on the first subset of resources 352.

Executing the first DevOps pipeline stage includes accessing first pipeline stage input data (407). For example, stage 331A can access data 361. Executing the first DevOps pipeline stage includes operating the first DevOps pipeline stage transforming the first pipeline stage input data into first pipeline stage output data (408). For example orchestrator 303 can operate stage 331 transforming data 361 into data 362. Executing the first DevOps pipeline stage includes deriving first stage operational data associated with operating the first DevOps pipeline stage (409). For example, orchestrator 230 can derive operational data 371A in association with operating stage 331A (e.g., execution tool image 213A).

Executing the first DevOps pipeline stage includes logging the first stage operational data (410). For example, orchestrator 203 can log operational data 371A in log 367. Executing the first DevOps pipeline stage includes determining that the first operational data satisfies the first policy conditions (411). For example, orchestrator 203 can determine that operational data 371 satisfies thresholds 332A. Executing the first DevOps pipeline stage includes notifying a party that the first policy conditions are satisfied (412). For example, orchestrator 203 can send notification 381 to user 301. User 301 can receive notification 381 (through user interface 204) from orchestrator 203. Gates 333A can suspend further operation of pipeline 331 until user approval is received.

Orchestrating the DevOps pipeline includes receiving approval from the party to transition to a next pipeline stage (413). For example, user 301 can send approval 372 (through user interface 204) to orchestrator 203. Orchestrator 203 can receive approval 372 from user 301.

Orchestrating the DevOps pipeline includes in response to the approval, executing the second DevOps pipeline stage at the second computing location (414). For example, in response to receiving approval 372, orchestrator 203 can execute stage 331B. Executing the second DevOps pipeline stage includes accessing the first pipeline stage output data (415). For example, stage 331B can access data 362. Executing the second DevOps pipeline stage includes utilizing at least a portion of the first pipeline stage output data as second pipeline stage input data (416). For example, stage 331B can utilize at least part of data 362 as input data.

Executing the second DevOps pipeline stage includes operating the second DevOps pipeline stage transforming the second pipeline stage input data into second pipeline stage output data (417). For example, orchestrator 203 can operate stage 331B transforming the at least part of data 362 into data 363. Executing the second DevOps pipeline stage includes deriving second stage operational data associated with operating the second DevOps pipeline stage (418). For example, orchestrator 203 can derive operational data 371B in association with operating stage 331B (e.g., execution of tool image 213B). Executing the second DevOps pipeline stage includes logging the second stage operational data (419). For example, orchestrator 203 can log operational data 371B in log 367.

Executing the second DevOps pipeline stage includes determining whether the second operational data does or does not satisfy the second policy conditions (420). For example, orchestrator 203 can determine whether operational data 371B satisfies thresholds 332B. In one aspect, orchestrator 203 determines that operational data 371 satisfies thresholds 332B. In another aspect, orchestrator 203 determines that operational data 371 does not satisfy thresholds 332B. Executing the second DevOps pipeline stage includes notifying another party of the determination (421). For example, orchestrator 203 can send notification 373 to user 301. User 301 can receive notification 373 (through user interface 204) from orchestrator 203. Gates 333B can suspend further operation of pipeline 331 until user approval is received. Notification 373 can indicate whether or not operational data 371B satisfies thresholds 332B.

When operational data 371B satisfies thresholds 332B, user 301 can send an approval (through user interface 204) to orchestrator 203. When operational data 371B doesn't satisfy thresholds 332B, user 301 can send a rejection or disapproval (through user interface 204) to orchestrator 203.

Orchestrating the DevOps pipeline includes proceeding to a next pipeline activity based on the determination (422). For example, in one aspect when user 301 approves operational data 371B, executing DevOps pipeline 331 includes orchestrator 203 executing one or more stage(s) 339 (which can be one or more of stages 337). A stage 339 can access data 363. The stage 339 can use at least a part of data 363 as input data. Orchestrator 203 can also configure appropriate thresholds and gates associated with the stage 339 in accordance with conditions 306 (including any access conditions defined in accordance with RBAC). Other activities (e.g., threshold checking, gate blocking, etc.) described with respect to method 400 can be performed at the stage 339. Output data from a stage 339 can be used as input for a next stage or may be considered the output of pipeline 331. In one aspect, a stage 339 may be the end of pipeline 331.

In another aspect, when user 301 rejects or disapproves operational data 371B, orchestrator 203 can halt execution of pipeline 331. In conjunction with a rejection or disapproval, user 301 can revert to workflow editor 202. User 301 can use workflow editor 202 to further edit workflow 305. Further editing can address possibly causes of deficiency in operational data 371B (e.g., failure to satisfy thresholds 332B).

Executing DevOps pipeline 331 can include orchestrator 203 executing one or more stage(s) 338 (which can be one or more of stages 336) in parallel with stage 331B. Executing a stage 338 can include accessing data 362 and utilizing at least another portion of data 362 as input data. Orchestrator 203 can also configure appropriate thresholds and gates associated with the stage 338 in accordance with conditions 306. Other activities (e.g., threshold checking, gate blocking, etc.) described with respect to method 400 can be performed at the stage 338. Output data from a stage 338 can be used as input for a next stage (e.g., a stage 339) or may be considered the output of pipeline 331. In one aspect, a stage 338 may be the end of pipeline 331. Likewise, output data from a stage 339 can be used as input for a next stage (e.g., a stage 338) or may be considered the output of pipeline 331. As described, a stage 339 may be the end of pipeline 331.

Parallel task processing can include a parallel task activity used to run multiple other pipeline activities at the same time. In one aspect, parallel activity execution can be limited to activities that are allowed to run in parallel. The parallel task activity can manage the multiple other pipelines activities within an over sequential pipeline.

Aspects also include nested or child pipelines where a "parent" pipeline orchestrates operation of a child pipeline as a single activity in a corresponding parent workflow. As such, a parent pipeline can contain multiple child pipelines (each corresponding to an activity in the parent pipeline). The parent can treat an entire child pipeline as just another activity.

A user can interact with pipeline manager 201 through user interface 204 to configure workflows defining one or more of: parallel pipeline stages, parallel pipeline activities, nest pipelines, child pipelines, etc.

Pipeline Security

Aspects also include orchestrating pipelines with increased security. Each activity in a pipeline can be encrypted and decrypted. Keys can be stored in a cloud vault or customer key vault.

Figure 6:
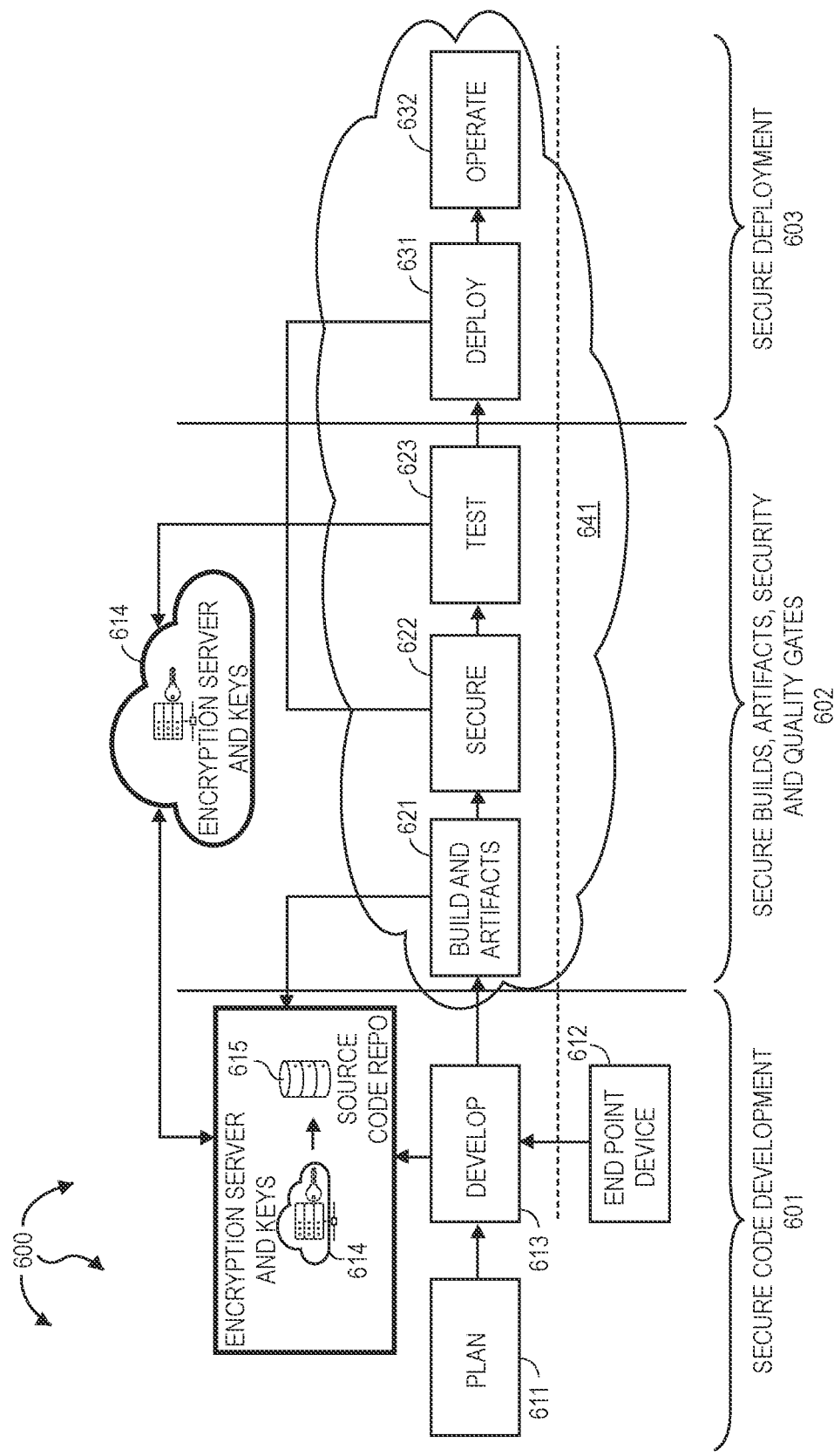
FIG. 6 illustrates an example engineering environment architecture facilitating end to end encryption form code development into production.

Moving forward to FIG. 6, FIG. 6 illustrates an example engineering environment architecture 600 facilitating end to end encryption from code development into production. As depicted, end to end decryption can include secure code development 601, secure builds, artifacts, security and quality gates 602, and secure deployment 603. Secure code development 601 can include plan 611 and development 613. Endpoint device 612 can be used to facilitate development 613. An encryption server and keys 614 can be stored in source code repo 615.

Secure builds, artifacts, security and quality gates 602, can include build and artifacts 621, secure 622, and test 623. Build and artifacts 621 can refer to source code repo 615. Secure 622 and test 623 can include accessing encryption server and keys 614 in the cloud. Secure deployment 602 can include deploy 631 and operate 632. Deploy 631 can include accessing encryption server and keys 614 in the cloud. Build and artifacts 621, secure 622, test 623, deploy 631 and operate 632 can occur in cloud 641.

In one aspect, RBAC defined access control conditions are integrated into engineering environment architecture 600 to supplement end to end encryption and/or further increase security.

Drag and Drop Pipeline Execution

Figure 5:
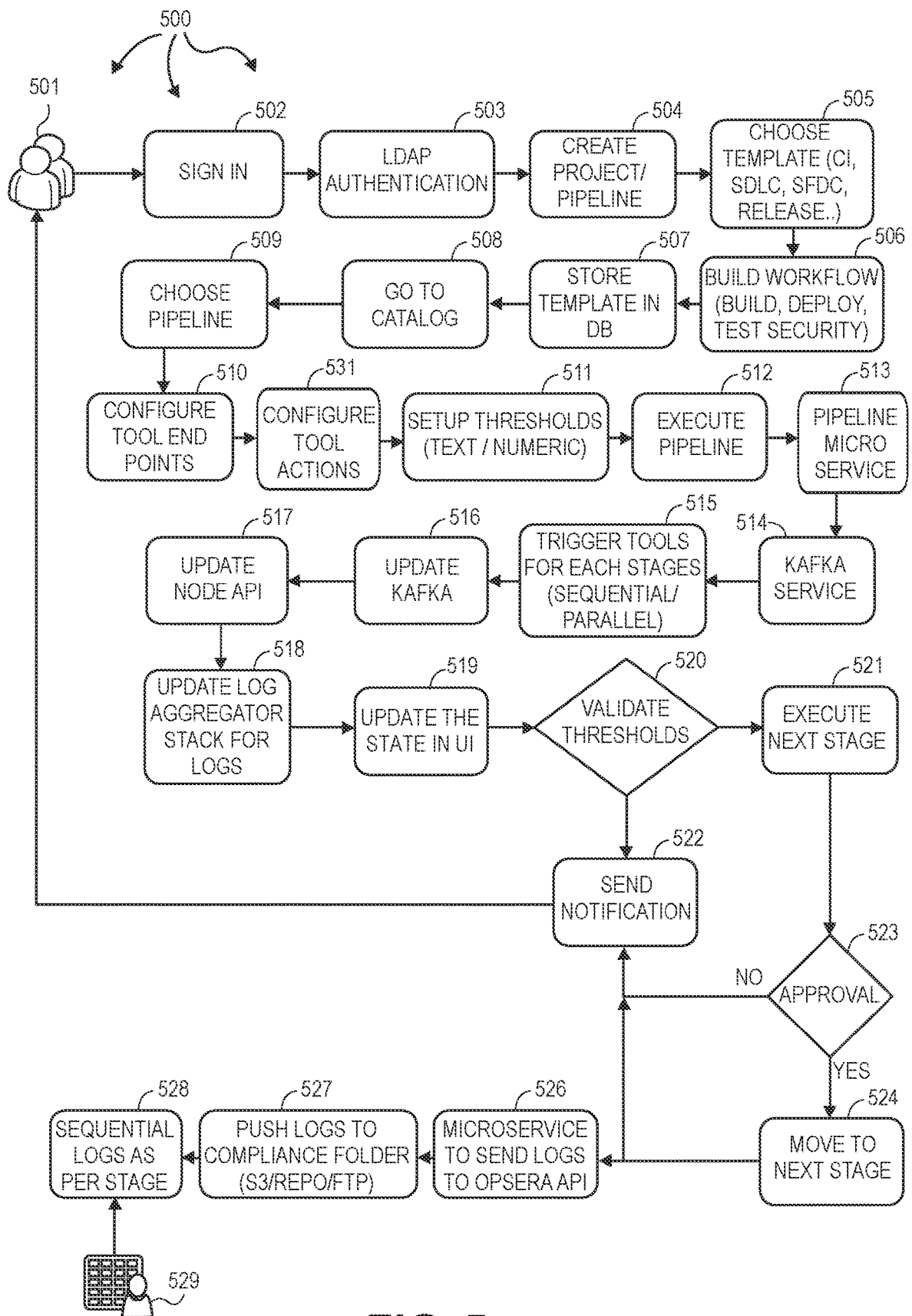
FIG. 5 illustrates a flow of an example method illustrating drag and drop pipeline execution.

Moving back to FIG. 5, FIG. 5 illustrates a flow of an example method 500 illustrating drag and drop pipeline execution. In one aspect, the modules of computer architecture 200, 300 and/or other similar modules are used to implement method 500. For example, user interface 204 can facilitate user interactions with a pipeline manager. Similar modules can also be used to implement plug and play execution using methods similar to method 500.

User 501 can sign in 502 with a pipeline manager. In one aspect, sign in is facilitated using ReactJS (or other Script library). At 503, the pipeline manager attempts to validate user 501. In one aspect, validation is facilitated via LDAP (or other directory access protocol).

User 501 can create a project/pipeline 504 and choose a template 505. In one aspect, project/pipeline creation and template selection is facilitated using ReactJS (or other Script library). A workflow is built 506 and a template stored in a database 507. User 501 can go to a catalog 508 and choose a pipeline 509. In one aspect, catalog interactions and pipeline selection is facilitated using ReactJS (or other Script library).

A pipeline manager (e.g., 201) can configure tools and endpoints 510, configure tool actions 531, setup thresholds 511, and execute the pipeline 512. The pipeline manager configures a pipeline microservice 513. The pipeline manager sends the pipeline microservice to a distributed streaming platform (e.g., Kafka) 514. A tool is triggered for each stage (sequentially and/or in parallel) 515 and the distributed streaming platform is updated 516. In one aspect, configuring a micro service, utilizing/updating a distributed streaming platform, and triggering tools is facilitated by Java (or other scripting language).

Configuring tool actions 531 can include configuring tool actions and functions for essentially any DevOps tool included in a pipeline without leaving a unified console. Configuring tools and endpoints 510, configuring tool actions 531, and setting up thresholds can be implemented via a User Interface (UI) (e.g., user interface 204), Application Program Interface (API), or Command Line Interface (CLI).

A node API is updated 517 and a log aggregator stack is update 518. Node API and log aggregator stack updates can be facilitated by NodeJS (or other scripting runtime environment). The pipeline manager can update the stage in user interface 519. A UI stage update can be facilitated using ReactJS (or other Script library). The pipeline manager can validate stage thresholds 520. The pipeline manager can use a messaging system (e.g., email, slack, text messaging, etc.) to send a notification 522 of threshold validation to user 501. The pipeline manager can propose executing a next pipeline stage 521 to an approving party (which can be user 501 or another party).

If approval is not received, user 501 can be notified (similar to 522). If approval is received, pipeline manager can move to a next pipeline stage 524. The microservice can send logs to a pipeline manager API 526. The microservice can send logs using Java (or other scripting language). The pipeline manager can push logs to a compliance folder 527. Logs can be pushed using NodeJS (or other scripting runtime environment). A party 529 (which may or may not be user 501) can view sequential logs per pipeline stage.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: user input, user selections, user provided DevOps tools, pipeline provided DevOps tools, tool images, tool profile information, tool registries, provider profile information, on-premise profile information, cloud provider profile information, tool catalogs, template catalogs, organization IDs, tool IDs, workflow IDs, templates, workflows, tool registries, conditions, thresholds, gates, pipeline stages, input data, output data, operational data, log data, notifications, approvals, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, user input, user selections, user provided DevOps tools, pipeline provided DevOps tools, tool images, tool profile information, tool registries, provider profile information, on-premise profile information, cloud provider profile information, tool catalogs, template catalogs, organization IDs, tool IDs, workflow IDs, templates, workflows, tool registries, conditions, thresholds, gates, pipeline stages, input data, output data, operational data, log data, notifications, approvals, etc.

Implementations of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, servers, mobile telephones, PDAs, tablets, routers, switches, and the like. The described aspects may also be practiced in distributed system environments (e.g., cloud environments) where local and remote computer systems, which are linked (either by hardwired data links, wireless data links, or by a combination of hardwired and wireless data links) through a network, both perform tasks. In a distributed system environment, program modules may be located in both local and remote memory storage devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as on premise, private cloud, community cloud, public cloud, hybrid cloud, and so forth. In this description and in the following claims, a "cloud computing environment" is an environment in which cloud computing is employed.

Hybrid cloud deployment models combine portions of other different deployment models, such as, for example, a combination of on premise and public, a combination of private and public, a combination of two different public cloud deployment models, etc. Thus, resources utilized in a hybrid cloud can span different locations, including on premise, private clouds, (e.g., multiple different) public clouds, etc.

IaaS is a category of cloud computing services that provide higher-level APIs used to dereference various low-level details of underlying network infrastructure like physical computing resources, location, data partitioning, scaling, security, backup, etc. PaaS is a category of that provides a platform allowing customers to develop, run, and manage applications without the complexity of building and maintaining the infrastructure typically associated with developing and launching an application. SaaS is a category of cloud computing services and a software licensing and delivery model in which software is licensed on a subscription basis and is centrally hosted.

Using PaaS models, a consumer can deploy consumer-created or acquired applications created using programming languages, libraries, services, tools supported by the provider, etc. to a cloud infrastructure. The consumer does not necessarily manage or control the underlying cloud infrastructure including network, servers, operating systems, or storage, but can control deployed applications and possibly configuration settings for an application-hosting environment.

In PaaS models, providers can deliver a computing platform, typically including operating system, programming-language execution environment, database, and web server. Application developers develop and run their software on a cloud platform instead of directly buying and managing the underlying hardware and software layers. With some PaaS, the underlying computer and storage resources scale automatically to match application demand so that the cloud user does not have to allocate resources manually.

Per DevOps tool, aspects of the invention can be implemented on cloud computing models that span one or more of on-premise, IaaS, and PaaS. As such, DevOps tools deployed using different models can be interconnected and managed as described. For example, a registered user's on-premise DevOps tool can be connected and chained with another DevOps tool deployed using a PaaS model. Per DevOps tool, cloud computing models can also be adjusted. For example, an on-premise DevOps tool can be re-deployed to a cloud or vice versa. A pipeline manager (e.g., 201) can manage redeploying and reconnecting and rechaining redeployed DevOps tools to other DevOps tools in a DevOps pipeline. In one aspect, virtual private clouds are utilized to abstract different cloud computing models corresponding to different DevOps tools.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

What is claimed:

1. A DevOps pipeline execution method comprising:
    using a drag and drop technique to configure a DevOps pipeline, including:

accessing a user specified workflow at a graphical user interface;
selecting a DevOps tool from a tool registry through the graphical user interface;
dragging the selected DevOps tool to the user specified workflow within the graphical user interface; and
dropping the selected DevOps tool on the user specified workflow within the graphical user interface; and
in response to dropping the selected DevOps tool on the user specified workflow, orchestrating the DevOps pipeline including orchestrating the selected DevOps tool and one or more other DevOps tools along with one or more of: source code, executable images, data, containers, and configuration between DevOps pipeline stages, including:
configuring a first DevOps pipeline stage, including the selected DevOps tool, at a first computing location in a first cloud computing platform by allocating resources of the first computing location according to the user specified workflow and a profile of the first cloud computing platform;
configuring a second DevOps pipeline stage, including another DevOps tool from among the one or more other DevOps tools, at a second computing location in a second cloud computing platform by allocating resources of the second computing location according to the user specified workflow and a profile of the second computing location;
generating a virtual private cloud including the resources of the first computing location in the first cloud computing platform and the resources of the second computing location in the second cloud computing platform by abstracting different cloud computing models of the first and second cloud computing platforms;
connecting and chaining first DevOps pipeline stage output to second DevOps pipeline stage input;
executing the first DevOps pipeline stage at the first computing location, including:
deriving first operational data associated with operating the first DevOps pipeline stage, including operating the selected DevOps tool;
logging the first operational data;
determining that the first operational data satisfies policy conditions by determining that the first operational data satisfies role based access control (RBAC) thresholds and gates of the policy conditions; and
notifying a party that the policy conditions are satisfied; and
receiving approval from the party to transition to a next pipeline stage.

2. The method of claim 1, further comprising:
encrypting the first operational data at the first computing location using keys stored in a vault;
in response to the approval, executing the second DevOps pipeline stage at the second computing location, including:
decrypting the first operational data using the keys stored in the vault;
deriving second operational data associated with operating the second DevOps pipeline stage with respect to the first operational data, including operating the other DevOps tool;
logging the second operational data;
determining whether the second operational data satisfies the policy conditions by determining that the second operational data satisfies role based access control (RBAC) thresholds and gates of the policy conditions; and
notifying another party of the determination; and
proceeding to a further pipeline activity based on the determination.

3. The method of claim 2, wherein executing the first DevOps pipeline stage comprises executing a first microservice;
wherein executing the second DevOps pipeline stage comprises executing a second microservice; and
wherein connecting and chaining first DevOps pipeline stage output to second DevOps pipeline stage input comprises connecting and chaining the first microservice to the second microservice.

4. The method of claim 1, further comprising:
receiving user login credentials through the graphical user interface; and
authenticating a user associated with the user specified workflow through the graphical user interface from the user login credentials.

5. The method of claim 1, further comprising:
creating a project through the graphical user interface;
selecting a template from template storage through graphical user interface; and
formulating the user specified workflow through user commands received at the graphical user interface and based on the selected template.

6. The method of claim 5, wherein selecting a template comprises selecting a template from among: a software development pipeline template, a data pipeline template, a machine learning pipeline template, an artificial intelligence pipeline template, a salesforce pipeline template, a service now developer pipeline template, a pega pipeline template, or a database (DB) deployment.

7. The method of claim 1, further comprising selecting the DevOps pipeline from a catalog through the graphical user interface.

8. The method of claim 1, further comprising configuring a threshold; and
wherein determining that the first operational data satisfies policy conditions comprises determining that the first operational data satisfies the threshold.

9. The method of claim 1, wherein logging the first operational data comprises forming a console log and an activity log from the first operational data; and
further comprising streaming the console log and the activity log to a party in real-time.

10. The method of claim 1, further comprising declaring the policy conditions through the graphical user interface, the policy conditions including one or more of: security conditions, quality conditions, compliance conditions, or custom thresholds associated with the first DevOps pipeline stage.

11. A system comprising:
a processor;
system memory coupled to the processor and storing instructions configured to cause the processor to:
use a drag and drop technique to configure a DevOps pipeline, including:
access a user specified workflow at a graphical user interface;
select a DevOps tool from a tool registry through the graphical user interface;
drag the selected DevOps tool to the user specified workflow within the graphical user interface; and drop the selected DevOps tool on the user specified workflow within the graphical user interface; and in response to dropping the selected DevOps tool on the user specified workflow, orchestrate the DevOps pipeline including orchestrating the selected DevOps tool and one or more other DevOps tools along with one or more of: source code, executable images, data, containers, and configuration between DevOps pipeline stages, including:

configure a first DevOps pipeline stage, including the selected DevOps tool, at a first computing location in a first cloud computing platform by allocating resources of the first cloud computing platform according to the user specified workflow and a profile of the first computing location;

configure a second DevOps pipeline stage, including another DevOps tool from among the one or more other DevOps tools, at a second computing location in a second cloud computing platform by allocating resources of the second cloud computing platform according to the user specified workflow and a profile of the second computing location;

generate a virtual private cloud including the resources of the first computing location in the first cloud computing platform and the resources of the second computing location in the second cloud computing platform by abstracting different cloud computing models of the first and second cloud computing platforms;

connect and chaining first DevOps pipeline stage output to second DevOps pipeline stage input;

execute the first DevOps pipeline stage at the first computing location, including:

derive first operational data associated with operating the first DevOps pipeline stage, including operating the selected DevOps tool;

log the first operational data;

determine that the first operational data satisfies policy conditions by determining that the first operational data satisfies role based access control (RBAC) thresholds and gates of the policy conditions; and notify a party that the policy conditions are satisfied; and receive approval from the party to transition to a next pipeline stage.

12. The system of claim 11, further comprising instructions configured to:

in response to the approval, execute the second DevOps pipeline stage at the second computing location, including:

derive second operational data associated with operating the second DevOps pipeline stage, including operating the other DevOps tool;

log the second operational data;

determine whether the second operational data satisfies the policy conditions by determining that the second operational data satisfies the RBAC thresholds and gates of the policy conditions; and notify another party of the determination; and proceed to a further pipeline activity based on the determination.

13. The system of claim 12, wherein instructions configured to execute the first DevOps pipeline stage comprises instructions configured to execute a first microservice;

wherein instructions configured to execute the second DevOps pipeline stage comprise instructions configured to execute a second microservice; and wherein instructions configured to connect and chain first DevOps pipeline stage output to second DevOps pipeline stage input comprise instructions configured to connect and chain the first microservice to the second microservice.

14. The system of claim 11, further comprising instructions configured to:

receive user login credentials through the graphical user interface; and authenticate a user associated with the user specified workflow through the graphical user interface from the user login credentials.

15. The system of claim 11, further comprising instructions configured to:

create a project through the graphical user interface;

select a template from template storage through graphical user interface; and formulate the user specified workflow through user commands received at the graphical user interface and based on the selected template.

16. The system of claim 15, wherein instructions configured to select a template comprise instructions configured to select a template from among: a software development pipeline template, a data pipeline template, a machine learning pipeline template, an artificial intelligence pipeline template, a salesforce pipeline template, a service now developer pipeline template, a pega pipeline template, or a database (DB) deployment.

17. The system of claim 11, further comprising instructions configured to select the DevOps pipeline from a catalog through the graphical user interface.

18. The system of claim 11, further comprising instructions configured to configure a threshold; and wherein instructions configured to determine that the first operational data satisfies policy conditions comprise instructions configured to determine that the first operational data satisfies the threshold.

19. The system of claim 11, wherein instructions configured to log the first operational data comprise instructions configured to form a console log and an activity log from the first operational data; and further comprising instructions configured to stream the console log and the activity log to a party in real-time.

20. The system of claim 11, further comprising instructions configured to declare the policy conditions through the graphical user interface, the policy conditions including one or more of: security conditions, quality conditions, compliance conditions, or custom thresholds associated with the first DevOps pipeline stage.

* * * * *